Figure 1:
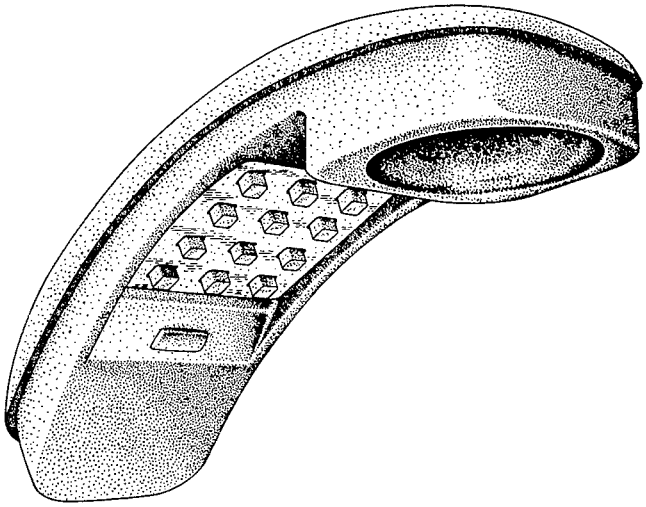
Figure 2:
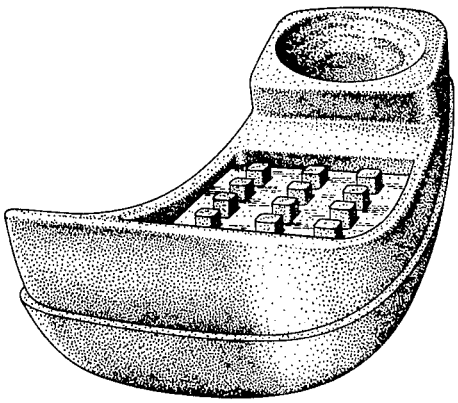
Figure 3:
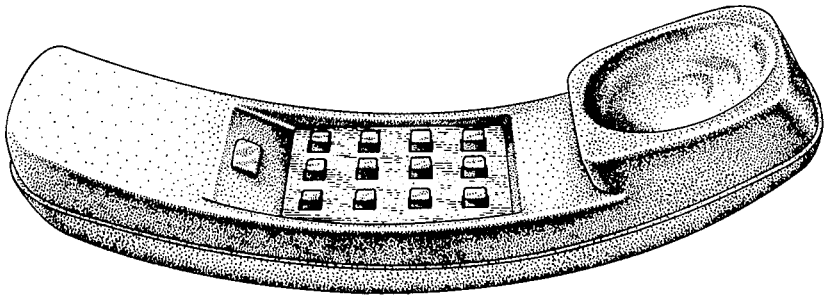
Figure 4:
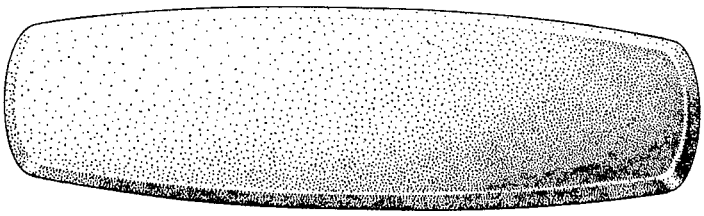
Figure 5:
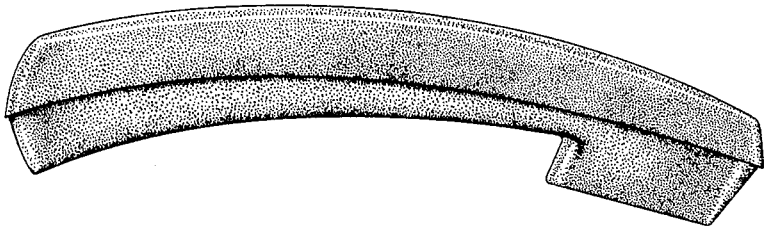

United States Defensive Publication [19] (H) [11] T955,001

Genaro et al. [43] Feb. 1, 1977

[54] TELEPHONE SET

[75] Inventors: Donald Michael Genaro, Haworth, N.J.; John Niel McGarvey, Drexel Hill, Pa.; Stanley Edward Seretny, Indianapolis, Ind.; Alvin Richard Tilley, Red Bank, N.J.; Carl Eugene Webb, Indianapolis, Ind.

[73] Assignee: Bell Telephone Laboratories, Incorporated, Murray Hill, N.J.

[21] Appl. No.: 637,175

[22] Filed: Dec. 3, 1975

[51] Int. Cl. ..... D 14/03

[52] U.S. Cl. ..... D26/14 A

[57] ABSTRACT

An ornamental design for a telephone is disclosed in which the telephone is arcuate and includes a pushbutton dial that has a planar face and rectangular pushbuttons. The longitudinal walls on each side of the dial vary in height, the walls having a greater height at their ends than in the middle. In addition, the portion of the set between the dial and the mouthpiece end of the set includes a planar inclined ramp that extends at an angle to both the flat surface of the dial and the curved surface of the set.

1 Claim, 2 Sheets Drawing,

1 Pages Specification

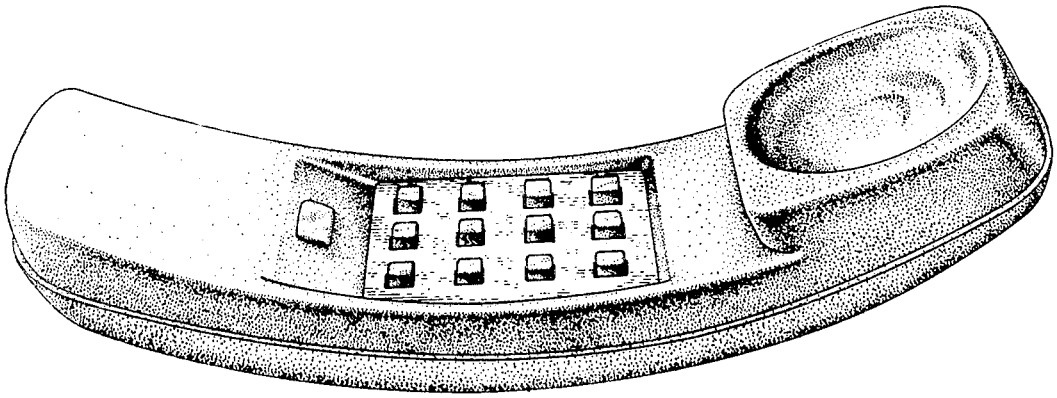

The file of this unexamined application may be inspected and copies thereof may be purchased (849 O.G. 1221, Apr. 9, 1968).